US006540198B2

(12) United States Patent  
Carter et al.

(10) Patent No.: US 6,540,198 B2
(45) Date of Patent: Apr. 1, 2003

(54) MAST PAYLOAD DOCKING STATION (75) Inventors: Edward V. Carter, Edwardsville, IL (US); Jeffrey S. Fitzgerald, Florissant, MI (US)

(73) Assignee: Engineered Support Systems, Inc., St. Louis, MO (US)

( * ) Notice: Subject to any disclaimer, the term of this patent is extended or adjusted under 35 U.S.C. 154(b) by 0 days.

(21) Appl. No.: 09/844,941

(22) Filed: Apr. 27, 2001

(65) Prior Publication Data

US 2002/0158182 A1 Oct. 31, 2002

(51) Int. Cl.[7] ................................................ F16M 1/00
(52) U.S. Cl. ........................ 248/638; 248/639; 248/603; 248/624; 224/42.32; 224/929; 224/551
(58) Field of Search ................................ 248/603, 624, 248/638, 639, 647, 651; 224/401, 42.32, 42.35, 546, 547, 551, 908, 929

(56) References Cited

U.S. PATENT DOCUMENTS

| | | | | |
|---|---|---|---|---|
| 3,163,039 A | * | 12/1964 | Newman et al. | 33/321 |
| 4,020,491 A | * | 4/1977 | Bieser et al. | 33/318 |
| 4,118,707 A | * | 10/1978 | Yoshida et al. | 33/321 |
| 4,162,708 A | * | 7/1979 | Johnson | 172/4.5 |
| 4,193,308 A | * | 3/1980 | Stuhler et al. | 33/327 |
| 4,442,435 A | * | 4/1984 | Kiryu et al. | 33/321 |
| 4,582,291 A | * | 4/1986 | Matthews | 248/550 |
| 6,149,112 A | * | 11/2000 | Thieltges | 224/908 |
| 6,213,438 B1 | * | 4/2001 | Ostby et al. | 224/539 |

* cited by examiner

Primary Examiner—Korie Chan
(74) Attorney, Agent, or Firm—Polster, Lieder, Woodruff & Lucchesi, LC (57) ABSTRACT A docking station (10) comprises a mast latch assembly (12) which attaches to the outer end of a mast (M). An adapter (14) which connects to a sensor platform (G) disengagingly attaches to the mast latch assembly. An isolation assembly (16) mounts on a surface (D) of a vehicle (V) adjacent an opening (O) through which the mast extends and retracts. As the mast is retracted, the adapter (14) engages with isolation assembly (16) and disengages from the mast latch assembly. This attaches the sensor platform to the isolation assembly which now protects the sensors from vibrations produced by the vehicle and any shocks created by the terrain over which the vehicle travels. It also allows the sensors to be used for surveillance during vehicle travel. When the vehicle stops and the mast is again extended, the adapter (14) re-engages with the mast latch assembly and is disengaged from the isolation assembly.

34 Claims, 8 Drawing Sheets

FIG. 7A (OPEN)

FIG. 7B (CLOSED)

MAST PAYLOAD DOCKING STATION

CROSS REFERENCE TO RELATED APPLICATIONS

STATEMENT REGARDING FEDERALLY SPONSORED RESEARCH OR DEVELOPMENT

BACKGROUND OF THE INVENTION

This invention relates to a docking station for use on a variety of vehicles including military vehicles, and more particularly, to a docking station which allows different suites of instruments (mast mounted sensors) to be left mounted on the vehicle while the vehicle is in motion, the docking station isolating the sensors from vehicle vibration and shock during the vehicle's travel from one location to another.

It is well-known to use sensor packages (suites) on vehicles to collect various types of information. In co-pending, co-assigned U.S. patent application Ser. No. 09/755,819 (now U.S. Pat. No. 6,396,235), there is described a stabilized common gimbal (SCG) on which a primary suite of sensors is mounted, and on which a second and separate set of sensors can also be mounted. There are a variety of vehicle applications for these sensors which can include electro-optic, microwave, optical and acoustic sensors. The particular sensors employed depends upon the purpose for which the vehicle is utilized. The sensors are installed on the outer end of a mast whose base is inside the vehicle and which is extendible and retractable above a surface (deck) of the vehicle. When the vehicle is stopped or parked, the mast is extended so the sensors, some of which are boresighted and some of which are not, can be used for surveillance and intelligence gathering purposes. When it is necessary to move the vehicle, the mast is retracted. This is because the vehicles on which the sensors are mounted typically travel over rugged terrain and often at high speed. If the mast were extended, the forces acting on it would probably cause it to buckle. In addition, the G-forces produced would probably damage the sensors rendering them unusable. These forces are produced by the vibration and shock experienced by the vehicle while moving.

Previously, use of a spring-damper system (shock isolators) between the sensors and mast has been found to improve sensor durability; however, stabilization accuracy of the sensors is reduced. Commonly, for safety reasons and the structural integrity of the mast and the sensors mounted on it, the mast is fully retracted prior to the vehicle's moving. In addition, it is also a common practice to remove the sensors from the mast and stow them aboard the vehicle prior to its moving from one location to another. When the vehicle is again parked, the sensors are again mounted on the mast which is then re-extended. Removal of the sensors destroys the boresighting previously done and requires a new boresighting if accurate information is to be gathered. This is time consuming, and in combat situations exposes military personnel to injury as they remove and then reinstall the sensors.

The apparatus of the present invention solves these problems by providing a docking station which enables the sensor payload mounted on the mast to perform its surveillance function while the vehicle is stationary, and then parks the sensor package in a vibration isolated and shock-free installation when the mast is retracted and the vehicle is moving. This eliminates the need to remove and reinstall the sensors and also eliminates the need to re-boresight the sensors when the vehicle stops again. Accordingly, personnel no longer need to leave the vehicle eliminating the risk of harm to them. In addition, the docking station permits sensor surveillance to continue while the vehicle is moving. This increases the effectiveness of the sensors since they are now deployed in both modes of vehicle operation.

BRIEF SUMMARY OF THE INVENTION

Among the several objects of the present invention is the provision of a docking station installed on a vehicle employing mast mounted sensors. The docking station includes an isolation platform, a mast latch assembly, and a payload or gimbal adapter. The payload adapter rigidly attaches to (is docked with) the sensor suite structure as well as to the mast latch assembly when the mast is extended. During retraction of the mast prior to vehicle movement, the payload adapter is unlatched from the mast latch assembly and latched (docked) to the isolation platform. This installation now protects the sensors from vibration and shock loading damage during vehicle movement. Importantly, the sensors are fully operational in this mode so surveillance can be performed while the vehicle is moving. When the vehicle stops and the mast is again extended, the sensor payload is disconnected from the isolation platform and again latched to the mast latch assembly. This provides maximum stabilization of the sensor payload while the vehicle is stationary so accurate information can again be gathered.

Another advantage of the invention is that by allowing the sensors to remain installed at all times, the need to boresight the sensors each time the vehicle stops is eliminated. Use of the docking station eliminates the need for personnel to leave the vehicle in order to retrieve the sensor suite and stow it prior to the vehicle's movement from one location to another, as well as having to unstow and reinstall the sensor suite when the vehicle reaches its new location. Since personnel can now remain in the vehicle at all times, their risk of injury is greatly reduced. Further, uncoupling the sensor payload from the mast while the mast is being retracted now allows full retraction of the mast so the mast is not damaged during vehicle movement.

Finally, a method is disclosed of raising and lowering a mast and docking any sensors mounted on the mast so to substantially reduce the possibility of damage to either the mast or the sensors and to provide maximum utilization of the sensors for intelligence gathering.

Briefly stated, the present invention is directed to a docking station for use on a vehicle having an extendible and retractable mast on which is mounted one or more sensors. The sensors are mounted on a gimbal. The docking station includes a mast latch assembly which also attaches to the mast. The gimbal is mounted on a payload adapter that interconnects with the mast latch assembly to latch them together when the mast is extended. An isolation assembly mounts on a surface of the vehicle adjacent an opening in the vehicle through which the mast projects. As the mast is retracted, the payload adapter first is latched to the isolator assembly, and then unlatched from the mast latch assembly. The mast then is fully retracted inside the vehicle. The isolation assembly now protects the sensors from damage due to shock and vibration as the vehicle moves. Further, the sensors can be used to obtain information and if this requires that the sensors be moved from one orientation relative to the vehicle to another, the isolation assembly enables this movement. When the vehicle is stopped and the mast extended, the mast latch assembly first engages the payload adapter which is then disconnected from the isolation assembly. The mast can now be fully extended. Other objects and features will be part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

Corresponding reference characters indicate corresponding parts throughout the several views of the drawings.

DETAILED DESCRIPTION OF INVENTION

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention.

Referring to the drawings, a vehicle V (see FIG. 1A) has an outer surface or deck D. A mast M for mounting sensors S of various types is installed in the vehicle and a portion of the mast extends through an opening O in the vehicle's deck. The mast is extendible and retractable. The lower end ML of the mast is connected to a mast drive MD which extends and retracts an upper portion MU of the mast so to raise and lower the mast and the sensors mounted thereon. For this purpose, the upper portion of the mast includes a plurality of telescoping mast extensions ME with the smaller diameter extensions nesting inside the larger diameter extensions. The mechanism by which the mast is raised and lowered is well-known in the art and will not be described. Typically, the mast is raised when the vehicle is parked, and lowered when the vehicle is being driven from one location to another.

Figure 1:
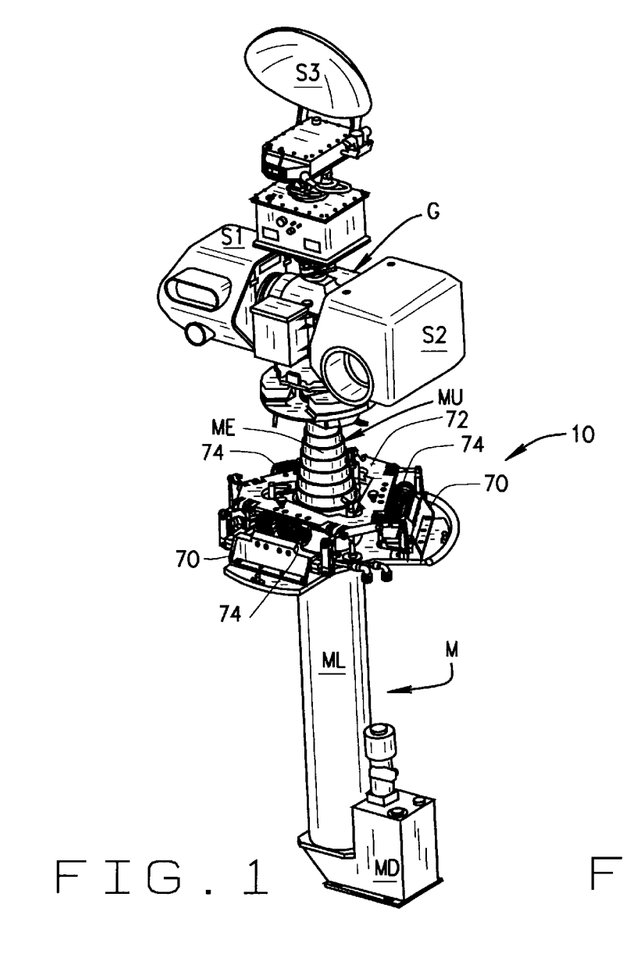
FIG. 1 is a perspective view of a stabilized common gimbal with primary and secondary sensor suites installed on a docking station of the present invention.
Figure 1A:
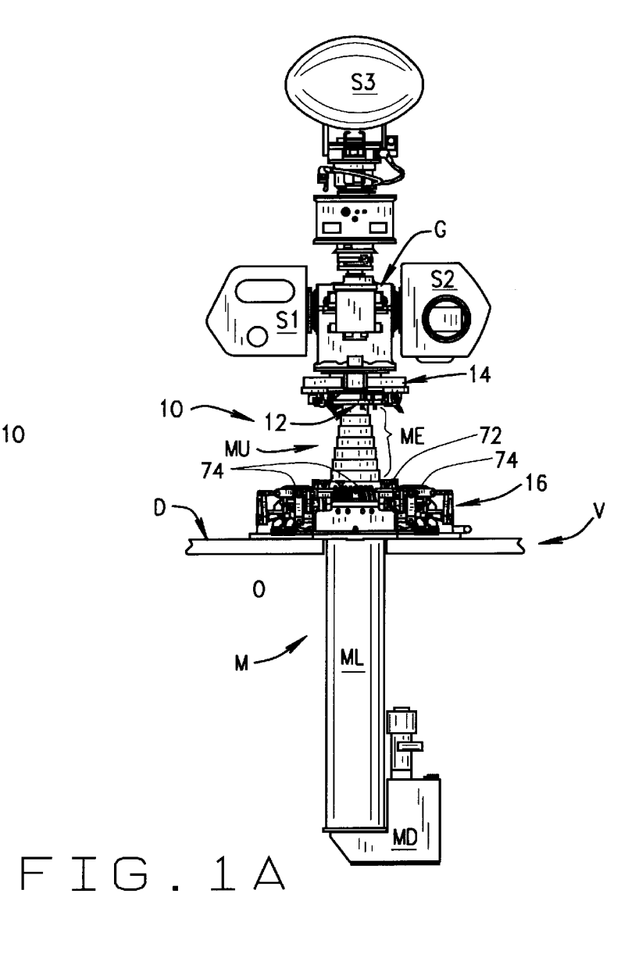
FIG. 1A is an elevational view of the assembly.

A gimbal assembly G such as the stabilized common gimbal described in the co-pending, co-assigned patent application previously referred to is carried on the mast. In FIGS. 1 and 1A, various sensors (the sensor payload) are shown mounted on the gimbal assembly. A first sensor or sensor suite S1 comprises a camera pod including a camera and its associated optics. A second sensor or sensor suite S2 comprises a forward looking infrared or FLIR assembly. Sensors S1 and S2 are shown mounted on opposite sides of the gimbal assembly. Mounted atop the gimbal is a third sensor S3 comprising a radar. Those skilled in the art will appreciate that other sensors may be mounted on the platform provided by the gimbal assembly besides those mentioned herein. It is a feature of the stabilized common gimbal that the sensor S1 is boresighted in accordance with an automated procedure. As previously discussed, in prior mast/sensor installations, it has been necessary to remove the sensors whenever the vehicle is to be moved. This was because of the damage done to the mast and sensors due to vehicle vibrations and road shocks which occur as the vehicle moves. Besides the time required to dismount and stow the sensors prior to the vehicle moving, and remounting the sensors once the vehicle is again parked, another disadvantage was that the sensor S1 had to be re-boresighted. In accordance with the present invention, this is no longer necessary. Rather, the sensors remain mounted in place at all times and can now be used for information acquisition even while the vehicle is traveling.

Figure 2:
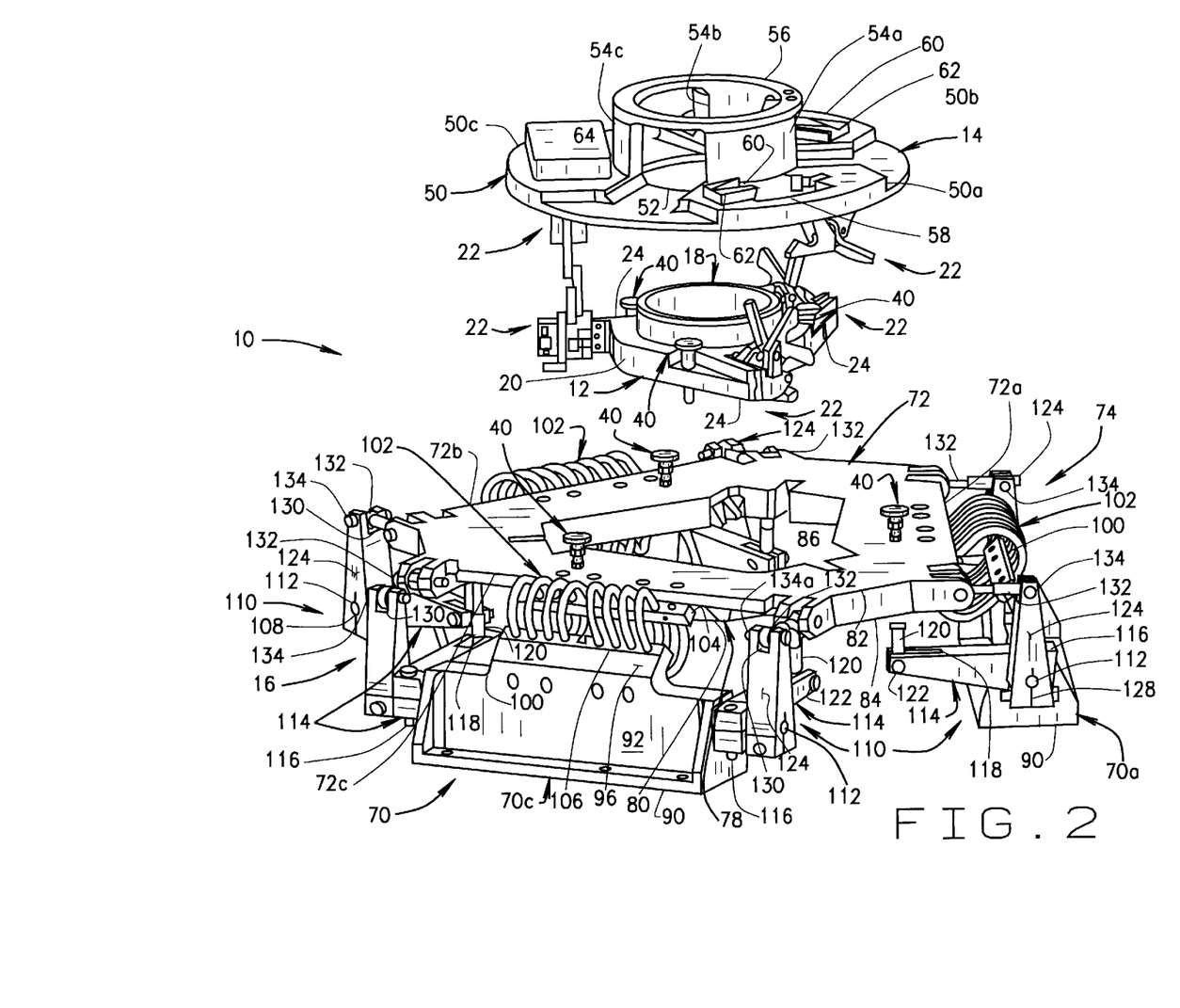
FIG. 2 is a perspective view of the docking station showing its constituent components.

A docking station 10 of the present invention is particularly shown in FIG. 2. As shown therein, the docking station first comprises a mast latch means or assembly 12 which attaches to the outer end of mast M (see FIGS. 1 and 1A). Next, an adapter means or payload adapter 14 connects to gimbal assembly G (also see FIGS. 1 and 1A). Adapter 14, as described hereinafter, is disengagingly attached to mast latch means 12. Finally, an isolation assembly 16 is mounted on surface D of vehicle V adjacent opening O. As noted, mast M extends and retracts through this opening. In accordance with the invention, payload adapter 14 engages with isolation assembly 16 when mast M is retracted into the vehicle. This action, by which the sensor payload is docked to the isolation assembly, also includes disengagement of the payload adapter from mast latch assembly 12. These actions serve to attach the sensor payload (gimbal assembly G) to the isolation assembly with the isolation assembly now protecting the sensors from damage caused by shock and vibration as the vehicle moves. When the vehicle next stops and mast M is again extended, payload adapter 14 re-engages with the mast latch assembly 12 as the mast is raised and at the same time is disengaged from isolation assembly 16. That is, the sensor payload is undocked from the isolation assembly and docked with the mast latch assembly so to be raised above the vehicle deck as the mast is raised.

Figure 5:
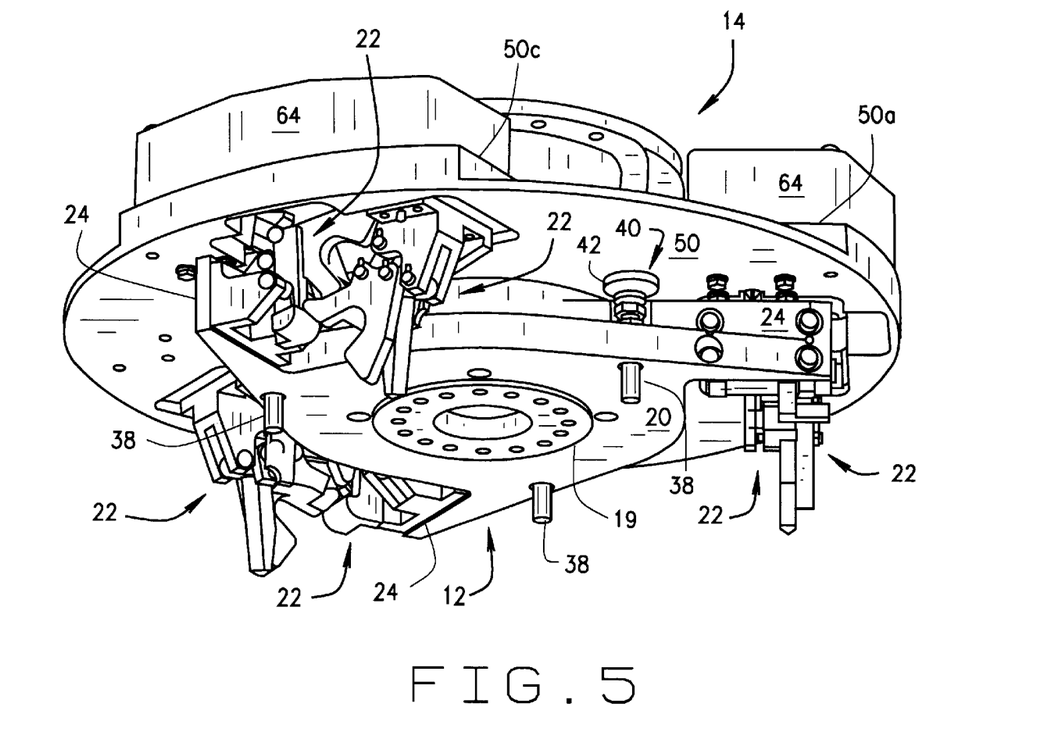
FIG. 5 is a perspective view of a mast latch assembly of the docking station shown attached to the payload adapter.
Figure 6:
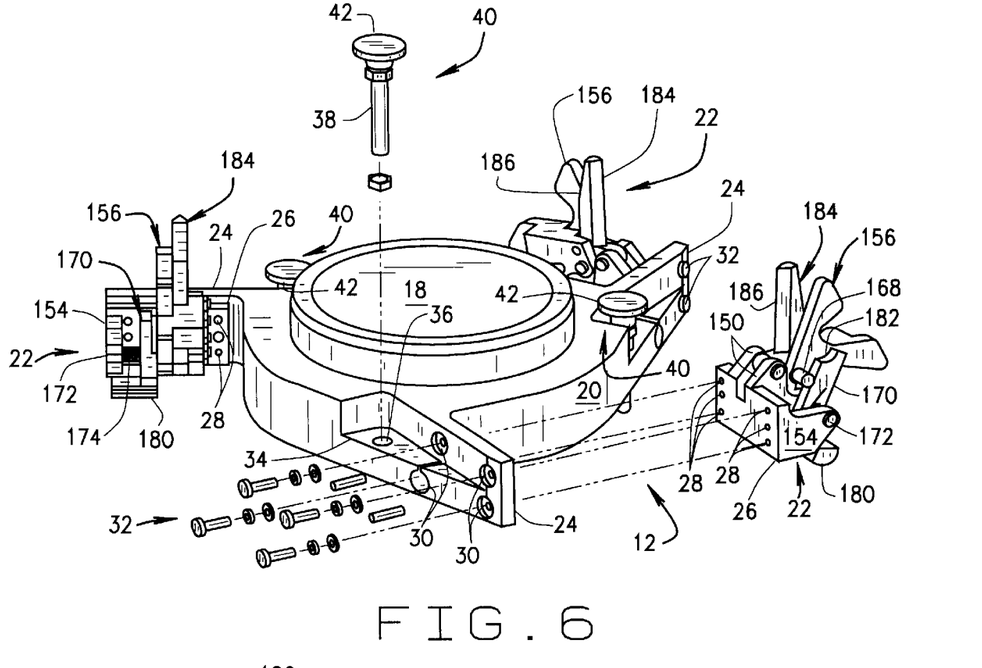
FIG. 6 is a perspective view of the mast latch assembly partly disassembled.

Referring to FIGS. 2 and 6, mast latch assembly 12 is shown to include a cylindrically shaped collar 18 the diameter of which corresponds to the outer diameter of mast M at the upper end of the mast. The collar is installed over the upper end of the mast and is attached to the mast in any convenient manner. As shown in FIG. 5, a base plate 19 fits across the bottom of the collar. The base plate has a series of circumferentially spaced openings formed in it for attaching the mast latch assembly to the top of the mast using fasteners (not shown).

Figure 7A:
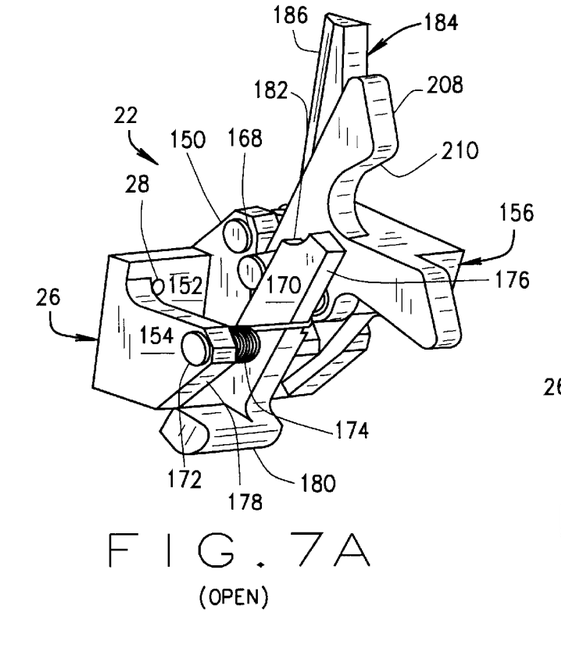
FIGS. 7A and 7B are perspective views of a latching mechanism installed on the mast latch assembly and payload adapter for engaging the payload adapter, the mechanism being shown in its open position in FIG. 7A and in its closed position in FIG. 7B.
Figure 7B:
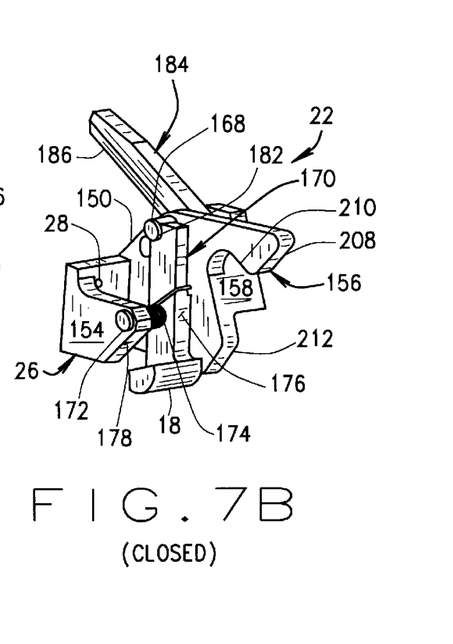

A flange 20 extends circumferentially about the lower end of the collar and provides a mounting surface for a latching mechanism indicated generally 22 by which the mast latch assembly and payload adapter 14 engage each other. Operation of the latching mechanism is described hereinafter. As best shown in FIG. 6, three latching mechanisms 22 are mounted to flange 20, the mechanisms being uniformly spaced about the flange. At each mounting location, a plate 24 extends outwardly from the side of the flange. Referring to FIGS. 6, 7A and 7B, each latching mechanism includes a base 26 having openings 28 formed therein which correspond to openings 30 formed on plate 24. Base 26 is fitted into place on the plate, and when the openings 28, 30 are aligned, fasteners 32 are used to attach the base to the plate.

Each plate 24 has a shelf 34 formed on one side of it. A vertically extending opening 36 formed in an upper face of the shelf is for receiving a stem 38 of a pad assembly indicated generally 40. Assembly 40 includes a circular pad 42 mounted atop the stem. When the mast latch assembly and payload adapter engage each other, the pads support the payload adapter and insure that the two units do not damage each other as they come together or when they are separating.

Figure 4:
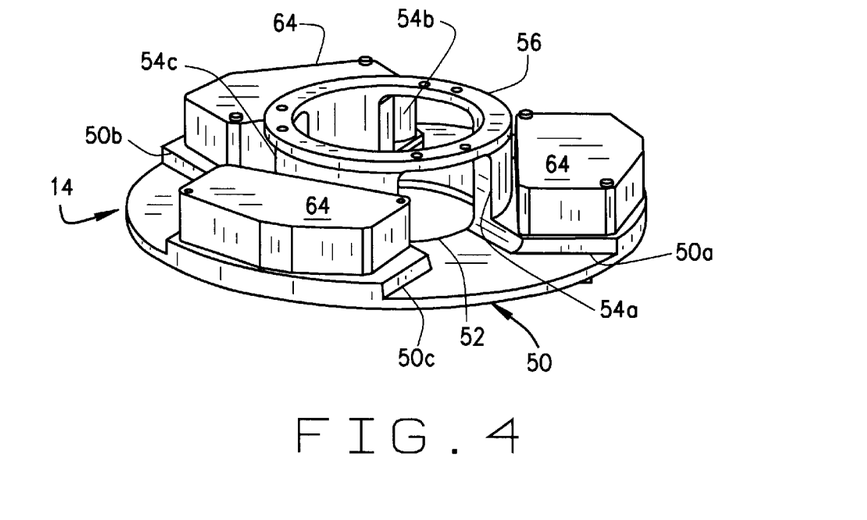
FIG. 4 is a perspective view of a payload adapter of the docking station to which the gimbal is mounted.

Referring to FIGS. 2, 4 and 5, payload adapter 14 comprises a circular plate 50 having a central opening 52 the diameter of which corresponds to the outer diameter of collar 18. A sidewall 54 comprised of three arcuate wall segments 54a–54c are uniformly spaced about the perimeter of opening 52. The wall segments extend a distance above a top surface of plate 52 and at their upper end extend circumferentially about the opening to join each other and form a mounting ring 56. A lower section of gimbal G is secured to mounting ring 56 using fasteners (not shown), so to attach the sensor payload and payload adapter together.

Radially outwardly of opening 52, and adjacent the respective wall segments 54a–54c, are raised sections 50a–50c of plate 50. As shown in FIG. 2, a generally rectangular shaped opening 58 is formed in each section 50a–50c and extends through plate 50. A mounting surface 60 is formed on, or is attached to the upper surface of each raised section 50a–50c. These raised sections each include a notch 62 for receiving a clamping element of the latching mechanisms 22 as is described hereinafter. On the opposite side of each opening 58, a base 26 for a latching mechanism similar to the mechanism 22 mounted on flange 20 of mast latch assembly 12 is mounted. As shown in FIG. 2, each latching mechanism 22 installed on mast latch assembly 12 is located next to a corresponding mast latch assembly on payload adapter 14 with the adjacent latch mechanism fitting side-by-side within the openings 58. It will be understood that the latching mechanisms installed on the mast latch assembly are for engaging the mast latch assembly with the payload adapter; while, the latching mechanisms mounted on the payload adapter are for engaging the payload adapter with the isolation assembly. Accordingly, the latching mechanisms mounted on the payload adapter, while substantially identical to those mounted on the mast latch assembly, are inverted with respect thereto. When the mast latch assembly and payload adapter engage each other as mast M is raised, the latch mechanisms on assembly 12 latch the assembly to the payload adapter. At this time, the upper end of collar 18 of assembly 12 is drawn into a sleeve on adapter 14 formed by opening 52 and wall segments 54a–54c so that the mast latch assembly and payload adapter interfit with each other. The distance to which the collar is drawn into the sleeve is determined by the height of the pads 42 of the pad assemblies 40 installed on the mast latch assembly. Finally, as shown in FIG. 4, a housing 64 is installed over each raised plate section 50a–50c so to protect the latching mechanisms from the elements, and damage caused by dirt and debris.

Isolation assembly 16 is comprised of three components. First, is a bracket assembly indicated generally 70 for mounting assembly 16 to the exterior deck surface of the vehicle. Second, is a platform or plate indicated generally 72 to which payload adapter 14 is attached (docked) when mast M is retracted. Third, is an isolation means indicated generally 74 by which platform 72 is attached to the brackets comprising bracket assembly 70. This isolation means attenuates shocks and vibrations transmitted through the vehicle and which would otherwise damage the instruments and sensors forming the sensor payload. Isolation assembly 16 further provides a stable mounting platform for the sensor payload so the sensors can be used to gather information not only when the vehicle is stationary, but also when it is moving.

Figure 3A:
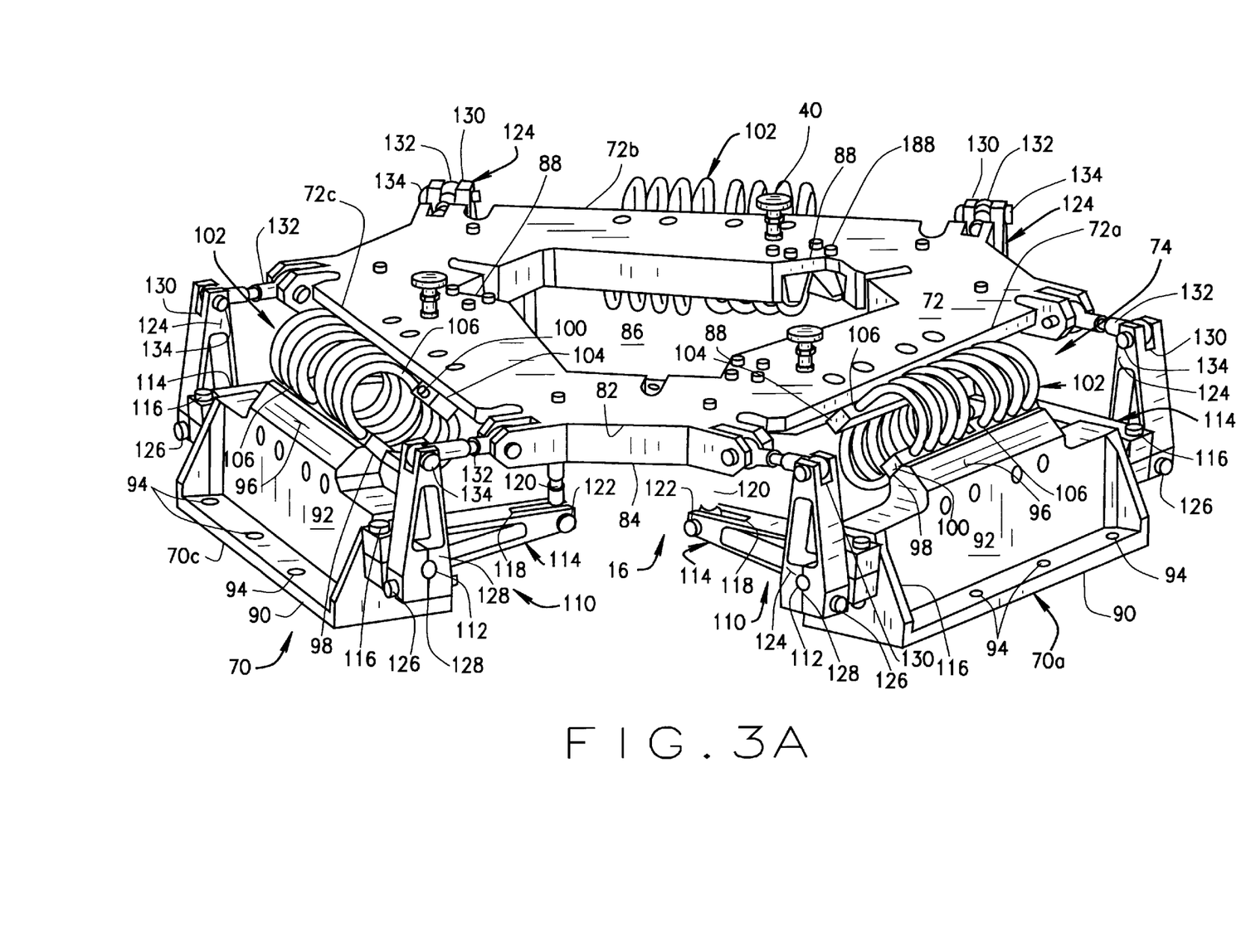
FIG. 3A is a perspective view of an isolation assembly of the docking station.
Figure 3B:
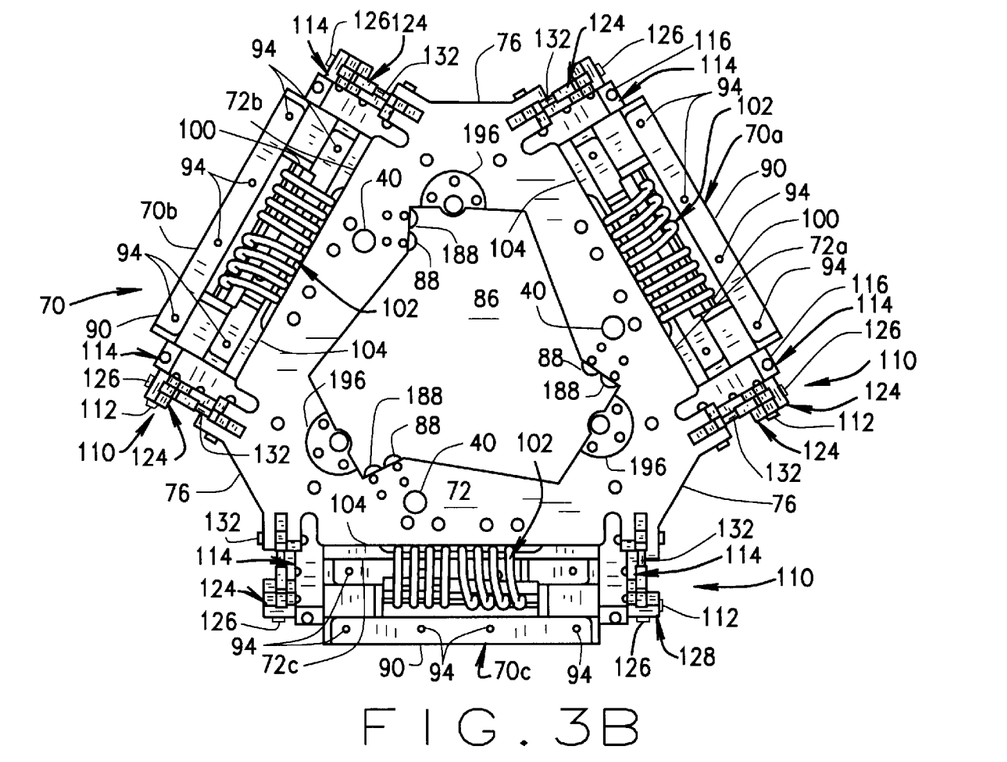
FIG. 3B is a plan view of the assembly, and FIG. 3C an elevational view thereof.
Figure 3C:
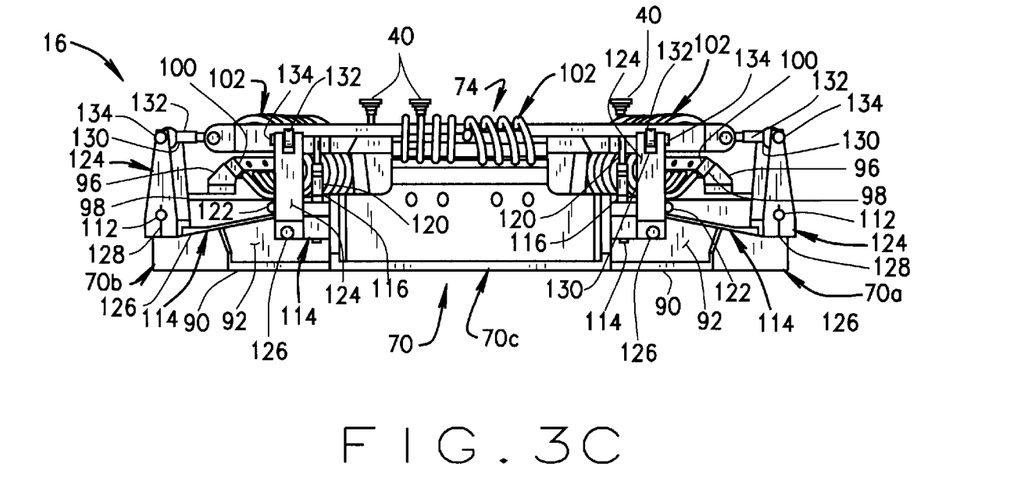

In FIGS. 2, 3A and 3B, plate 72 is shown to be generally triangular in shape when viewed in plan, and of a single-piece construction. The corners of the plate are truncated as indicated at 76 in FIG. 3B. Intermediate the length of each side 72a–72c of the plate is an integrally formed outwardly extending rectangular shaped projection 78 (see FIG. 2). An outer wall 80 of each projection slopes diagonally inwardly from a top surface 82 of plate 72 to a bottom surface 84 thereof. An opening 86 is formed in the middle of plate 72. As shown in FIG. 3B, this opening is generally triangular in shape with the corners of the triangle again truncated. Further, the inner margin of the plate defining the opening extends outwardly a short distance at a generally right angle at one corner of each end of the opening. This is as indicated at 88. The side of the opening then extends in a straight line from the outer end of this right angle section to the adjacent corner of the opening. The size of opening 86 in the platform is big enough to allow mast M and the attached mast latch means 12 to be retracted through the opening into the vehicle. However, payload adapter 14 engages platform 72 as this occurs and is latched to the platform. As described hereinafter, the latch mechanisms 22 on payload adapter 14 engage platform 72 at the corner locations of opening 86.

Bracket 70 consists of three separate, identically formed bracket members 70a–70c. Each bracket member is separately mounted to surface D of vehicle V, and each bracket member is used for attaching a portion of isolation means 74 to one side 72a–72c of plate 72. The brackets 70a–70c are generally T-shaped with each bracket having a base 90 and an outer, vertically extending center wall 92. Base 90 has a plurality of vertically extending, spaced openings 94 which accommodate bolts (not shown) for mounting the bracket member to the vehicle. At the top of each wall 92, intermediate the length of the wall, there is formed a vertical extension 96. An inner face 98 of extension 96 slopes inwardly from the top of the extension toward the base of the bracket member. Threaded bores (not shown) are formed in each face 98, at each end of each extension 96, for attaching a base plate 100 of isolation means 74 to the bracket member.

Isolation means 74 includes a cable isolator 102 which is connected to both plate 72 and one of the bracket members 70a–70c. Each cable isolator includes a base plate 100; which, as noted, attaches to face 98 of one of the bracket members. The isolator further includes another base plate 104, identical to base plate 100, and which attaches to outer wall 80 of plate 72 sidewall extension 78. Each base plate 100, 104 includes openings for respectively attaching base plate 100 to wall 92 of a bracket member 70a–70c, and base plate 104 to platform 72 using appropriate fasteners (not shown). Each cable isolator 102 is comprised of a multi-strand wire cable which is threaded through the bores 106 formed in the respective base plates so to form a coil extending from one end of each cable isolator to the other. The cable isolators are commercially available and it will be understood by those skilled in the art that more than one cable can be used for each isolator 102, each cable extending a portion of the length of the isolator.

When installed, the cable isolators connect platform 72 to the respective bracket members 70a–70c. The cable isolators are sufficiently strong to support platform 72 in a spaced relationship to the bracket members. The cable isolators are also flexible. This flexibility allows the cable isolators to attenuate the shock and vibration forces which are produced when vehicle V is moving, and which would otherwise be transmitted to the sensor payload mounted on the gimbal assembly. Rather, the cable isolators enable the platform to remain stable, as the vehicle moves, so little, if any, of the shock and vibration forces are transmitted to the sensors or instruments. The attenuation capability provided by isolation means 74 allows the sensor payload to remain installed at all times, and not be damaged when the vehicle moves, even over rugged terrain.

Since the sensor payload remains installed at all times, the sensors can now be used to obtain information while the vehicle is moving. In doing so, it may be necessary to re-orient the sensors or instruments in order to provide adequate surveillance while the vehicle is moving. This involves moving the gimbal assembly and the sensors installed on the gimbal assembly. For this purpose, a restraint mechanism indicated generally 110 is provided. The mechanism includes a pair of concentric torsion bars 112 and 113 both of which extend through a longitudinal bore formed in the bracket members 70a–70c. Bars 112 and 113 are sufficiently long so that the respective ends of the bar extend beyond the sides of the bracket member.

A pair of pitch levers 114 are mounted on respective ends of torsion bar 113. The two pitch levers are identically formed, each lever tapering in height from an outer end which mounts onto bar 113 towards an inner end of the lever. An opening formed adjacent the outer end of the lever allows the lever to be inserted onto the end of bar 113. A slit 114s extends between this opening and outer end of the lever. A vertical bore 114b extends through the pitch lever outwardly of the opening and is sized for a bolt 116 to be inserted through it so to attach lever 114 to bar 113 using a nut and washers. A slot 118 extends inwardly into the body of pitch lever 114 from the inner end of the lever. The slot is sufficiently wide to accommodate one end of a turnbuckle 120 the other end of which attaches to platform 72. When installed as described, the pitch levers allow plate 72 to flex upwardly and downwardly but maintain the orientation of plate 72 parallel to the deck of vehicle V.

Figure 10:
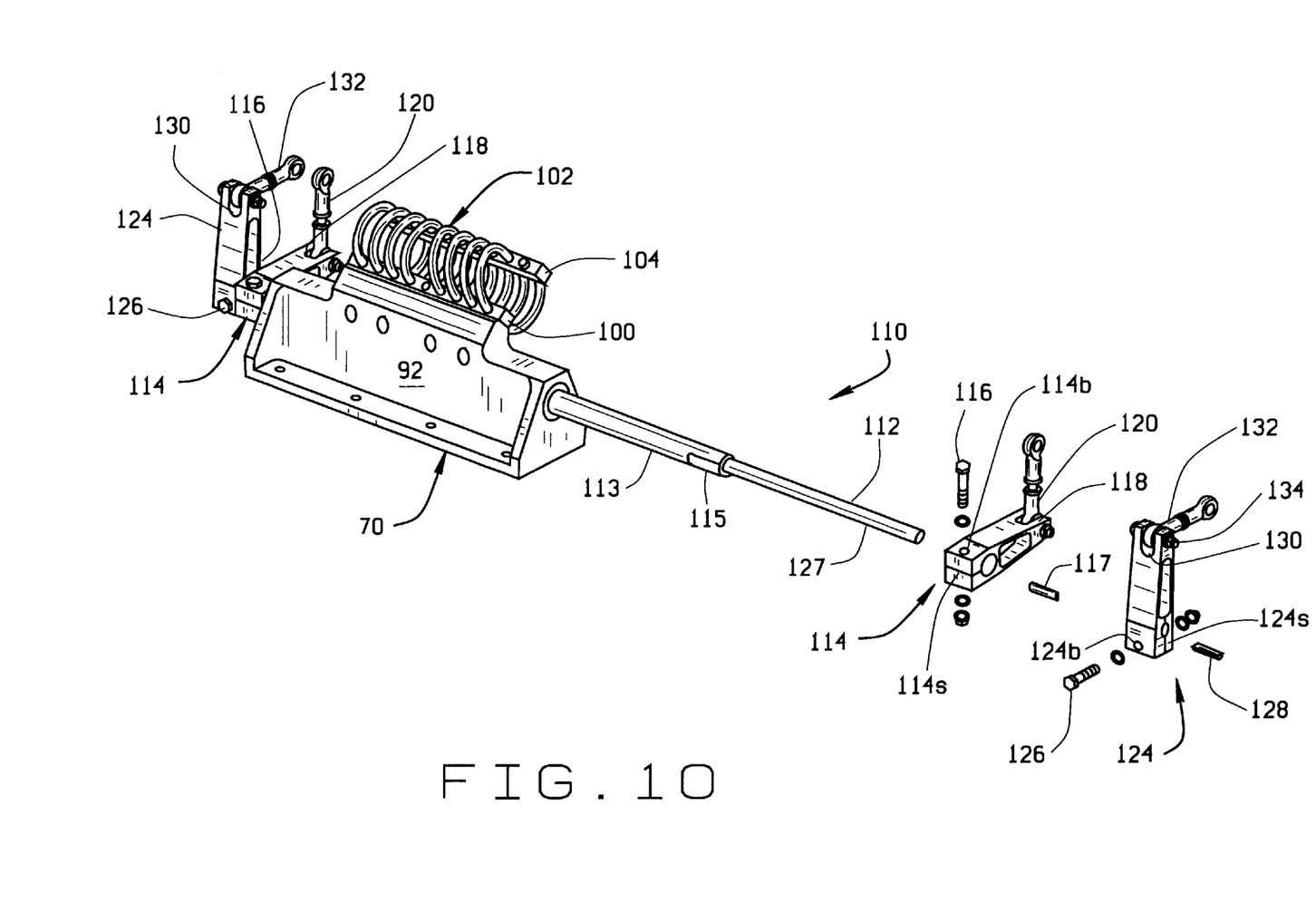

A pair yaw levers 124 are similar in construction to the pitch levers and are installed on the outer ends of torsion bar 112 outwardly of the pitch levers 114. As shown in FIG. 10, bar 112 fits inside of pitch torsion bar 113. The two yaw levers are also identically formed, each lever tapering in height from one end which mounts on bar 112 to an upper end of the lever. An opening adjacent the outer end of the lever facilitates insertion of the lever onto the outer end of bar 112. A slit 124s extends between this opening and outer end of the lever, and a bore 124b extends through the yaw lever outwardly of this opening. This bore is sized for a bolt 126 to be inserted through it and attach the yaw lever to the torsion bar using a nut and washers. The outer end of torsion bar 112 has a flattened section 127 and a semi-cylindrical insert 128 is inserted into an opening formed by the flattened section at the end of the torsion bar. This is similar to torsion bar 113 which has a flat section 115 at the outer end and an accompanying semi-cylindrical insert 117. The respective inserts facilitate adjustment of the pitch or yaw lever onto the respective torsion bar. A slot 130 extends inwardly into the body of yaw lever 124 from the outer end of the lever. The slot is sufficiently wide to accommodate one end of a turnbuckle 132. An outer end of the turnbuckle is attached to yaw lever 124 using a bolt 134 and an associated nut and washers. The bolt extends through a transverse bore extending from the sides of the yaw lever, and slot 130. The bolt is inserted through one side of the yaw lever, through slot 130, and then through the other side of the yaw lever. The other end of the turnbuckle is a treaded end which is inserted through an opening in the sidewall of plate 72. When installed, the yaw levers control side-to-side movement of plate 72.

As shown in the drawings, restraint mechanism 110 includes three sets of pitch levers 114 and yaw levers 124, one set for each bracket member. The pitch levers and yaw levers are individually mounted in place and are separately adjustable. For the pitch levers 114, this involves adjustment of the turnbuckles 120. For the yaw levers 124, this involves adjustment of the turnbuckles 132.

As previously mentioned, both mast latch assembly 12 and payload adapter 14 have a latching mechanism 22 installed thereon. In the drawings, these units each include three latching mechanisms, the mechanisms being mounted in a side-by-side, inverted relationship. Referring to FIGS. 6, 7A and 7B, and 8, each latching mechanism 22 has a base plate 26 which includes openings 28 at each end for mounting the latching mechanism to the mast latch assembly or payload adapter. A pair of spaced, L-shaped bracket arms 150 extend forwardly from a front face 152 of the base plate. A third bracket arm 154 also extends forwardly from one end of base plate 26. An actuation lever 156 of the latch mechanism has a generally L-shape with an arm 158 extending to one side of a main body 160 of the lever. Arm 158 has an extension 162 extending rearwardly of the arm. The arm and extension form a pocket on one side of lever 156. A pair of openings 164 formed in extension 162 are for mounting actuation lever 156 to base plate 26. A third opening 166 is for mounting a stop 168.

Mechanism 22 next includes a safety lever 170. The safety lever is mounted to bracket arm 154 of base plate 26 using a pin 172. A coil spring 174 is sized to fit on a shank portion of the pin. One end of the coil spring wraps over a front face 176 of the safety lever. The other end of the springs bears against a front wall surface 178 of bracket arm 154. At one end of the safety lever is a contact bar 180 which extends orthogonally of the main body of the safety lever. At the other end of the safety lever, a recess 182 is formed at one corner of the lever body. As shown in FIG. 7B, recess 182 is sized to receive stop 168 mounted on actuation lever 156. Coil spring 174 acts to bias safety lever 170 against stop 168.

The latching mechanism next includes a clamp 184. The clamp includes a knife edge 186 formed along one side of the clamp and extending generally the length of the clamp. Clamp 184 fits inside the pocket formed by arm 158 and arm extension 162 of actuation lever 156. Referring to FIGS. 3A and 3B, a notched plate 188 is shown attached to the inner face of plate 72 forming opening 86. These plates are mounted on the surfaces 88 previously described. When the payload adapter is engaging platform 72, the knife edges 186 of the clamps 184 fall into the notches in the respective plates 188. The plates now act as seats for the clamp bars to seat the payload adapter on the platform. The notches 62 on payload adapter 14 serve the same function to latch the mast latch assembly and payload adapter together when they are engaged.

Figures 8, 9:
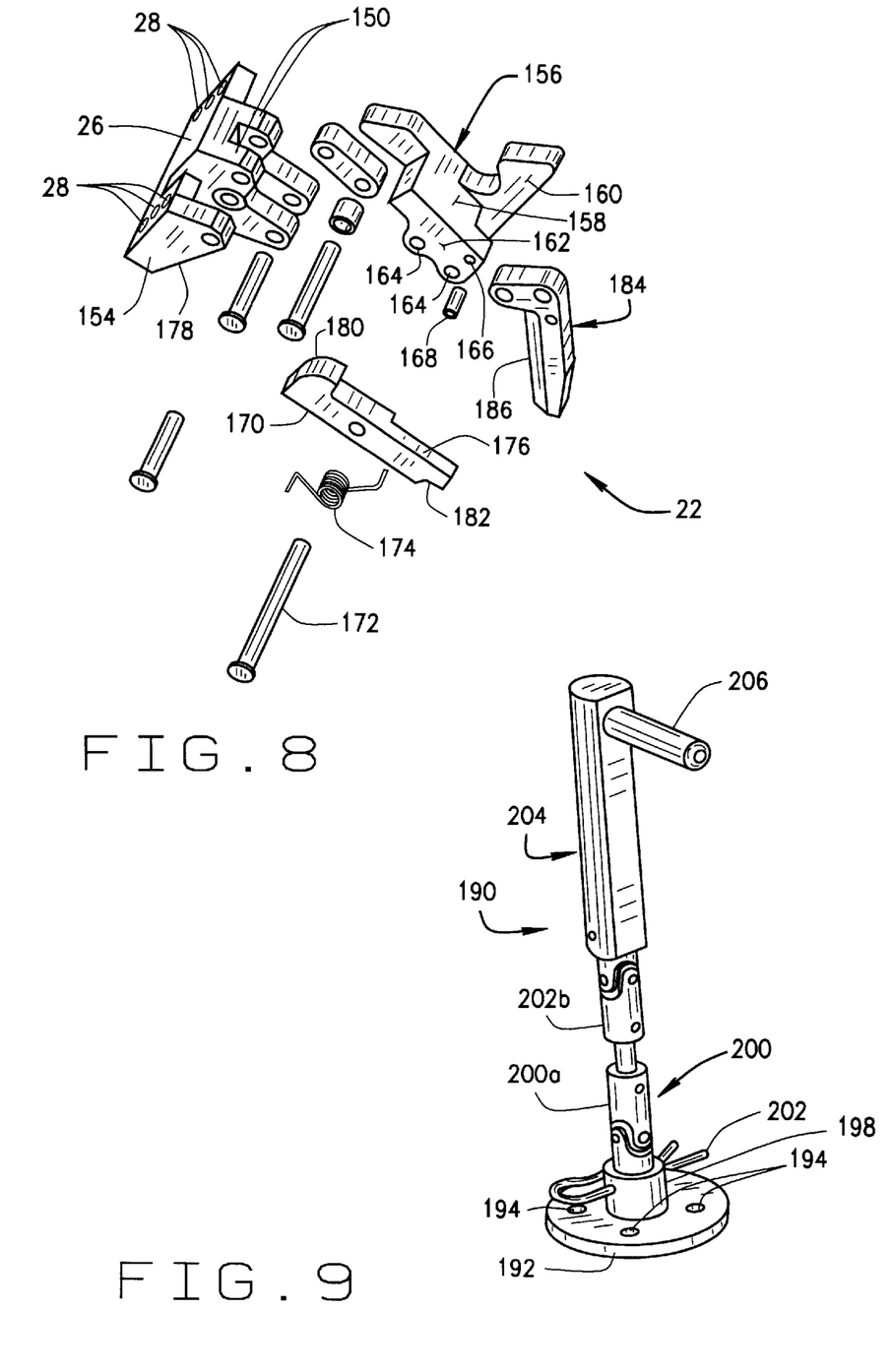
FIG. 8 is a perspective of the latching mechanism in its unassembled form, illustrating the levers and a clamp comprising the mechanism.
FIG. 9 is a perspective view of a strike bar assembly for actuating the latching mechanism to engage and disengage the docking station components from one another; and, FIG. 10 is a perspective view showing assembly of a restraint mechanism on a bracket of the isolation platform assembly.

Actuation of the latching mechanisms is accomplished by a strike bar assembly 190 shown in FIG. 9. The assembly first includes a circular plate 192 in which are formed openings 194 for mounting assembly 190 to the vehicle deck or to a supplemental adapter plate (not shown) attached to the deck of the vehicle. A guide bushing (not shown) mounts to a pad 196 on platform 72. Plate 192 further has a collar 198 concentrically formed on the top surface of the plate. A vertically extending post indicated generally 200 is installed on the plate using a cotter pin 202 or other convenient fastener. Post 200 has upper and lower hinged sections 202a, 202b, which allow the strike bar assembly flexibility. Fitting over, and attached to, the upper end of post section 202a is a cap 204. Projecting radially outwardly from the upper end of the cap is a strike bar 206. The function of the strike bar is to engage the respective latching mechanisms 22 on the mast latch assembly and payload adapter, as mast M is raised or lowered, so to effect the engagement of the payload adapter with the mast latch assembly (when the mast is raised) and the platform (when the mast is lowered). Three strike bar assemblies 190 are installed on platform 72 with the strike bar 206 of each assembly extending inwardly into the opening 86 in the middle of the platform. The guide bushing on the pad 196 is used to orient strike bar 206 relative to platform 72 and to provide radial support to cap 204.

Operation of the latching mechanisms are such that when mast M is raised, the edges 186 of the clamps 184 of the latching mechanisms installed on mast latch assembly 12 are engaged in the respective notches 62 on payload adapter 14. At this time, the actuation levers 156 of the latch mechanisms are at their position shown in FIG. 7B. In this position, pin 168 on the actuation lever is engaged in recess 182 of safety lever 170. Coil spring 174 is exerting a force on the safety lever urging it in a counter-clockwise direction (as shown in FIG. 7B). This, in turn, urges actuation lever 156 in a counter-clockwise direction. Since clamp 184 fits in the pocket formed by arm 158 and arm extension 162 of the actuation lever, arm 158 bears against the outer face of the clamp, forcing the knife edge surface 186 of the clamp into the notch 62 to clamp assembly 12 and adapter 14 together. At this time, the latching mechanisms 22 installed on adapter 14 are in their open position shown in FIG. 7A. In this position, a surface 208 of actuation lever 156 on the latching mechanisms 22 mounted on the payload adapter contact bar 180 of the safety lever 170 of the latching mechanism on the mast latch adapter.

As mast M is lowered, the strike bar 206 causes rotation of the actuation lever on the latching mechanism of the payload adapter so the actuation lever rotates in the direction which causes the pocket formed by arm 158 and arm extension 162 of the actuation lever to force clamp 184 into the notch of plate 188 on platform 72 and clamp the payload adapter to the platform. Importantly, while the payload adapter is now engaged with the platform, it is also still engaged with the mast latch assembly.

As the mast continues to lower, a contour surface 212 on actuation lever 156 on the latching mechanism on the payload adapter contacts bar 180 on safety lever 170 of the latching mechanism on the mast latch assembly so to rotate the safety lever and move recess 182 away from pin 168 on actuation lever 156 on the latching mechanism of the mast latch assembly. This frees actuation lever 156 on the latching mechanism of the mast latch assembly to move. Movement occurs when bar 206 of the strike bar assembly contacts surface 210 on actuation lever 156 causing the actuation lever of the latching mechanism on the mast latch assembly to rotate the latching mechanism from its closed position of FIG. 7B to its open position of FIG. 7A. This action further serves to move clamp 184 out of engagement with notch 62 on the payload adapter so to disengage the payload adapter from the mast latch assembly. As shown in the drawings, pad assemblies 40 are installed on the upper surface of platform 72. When the payload adapter engages the platform, these pads help support the payload adapter.

It will be appreciated that while the payload adapter is being disengaged from the mast latch assembly, that the safety lever 170 on the latching mechanisms of the payload adapter are being moved under the force of their associated coil springs 174 so the recess 182 on the one end of the safety levers contact the pins 168 on the actuation levers 156 of the latching mechanisms on the payload adapters so to lock these actuation levers in place with the clamps 184 clamping the payload adapter to plate 72. Now, mast latch assembly is withdrawn through opening 86 in the plate as mast M is fully retracted.

Those skilled in the art will understand that when mast M is again extended, the actions above described are reversed so to first engage the mast latch assembly with the payload adapter, next disengage the payload adapter from platform 72, and then fully extend mast M with the sensors and instruments mounted on gimbal G being raised to their surveillance and data gathering height above vehicle V.

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A docking station for use on a vehicle having an extendible and retractable mast, one or more sensors used for gathering information being installed on a platform connected to the mast so to be raised and lowered by the mast as the mast is extended and retracted, the docking station comprising:

mast latch means attached to an outer end of the mast;

adapter means connected to the platform and disengagingly attached to the mast latch means; and, isolation means mounted on a surface of the vehicle adjacent an opening therein through which the mast projects, the adapter means engaging the isolation means as the mast is retracted and disengaging from the mast latch means thereby to attach the platform to the isolation means which protects the sensors from damage caused by shock and vibration as the vehicle moves, the adapter means re-engaging with the mast latch means and disengaging from the isolation means when the mast is again extended.

2. The docking station of claim 1 wherein the sensors are mounted on a gimbal assembly and the adapter means is attached to the gimbal assembly.

3. The docking station of claim 1 wherein the mast latch means includes a latching mechanism for latching the adapter means and the mast latch means together when the mast is extended, and for disengaging the adapter means from the mast latch means when the mast is retracted.

4. The docking station of claim 3 wherein the adapter means also includes a latching mechanism for latching the adapter means to the isolation means when the mast is retracted.

5. The docking station of claim 4 wherein the latching mechanism of the mast latch means includes a plurality of latches.

6. The docking station of claim 5 wherein the latching mechanism on the adapter means includes a plurality of latches corresponding in number to the latches of the latching mechanism on the mast latch means.

7. The docking station of claim 6 wherein the mast latch means includes a collar on which the latches of the mast latch means are mounted and the adapter means includes a plate on which the latches of the adapter are mounted with the respective latches of the mast latch means and the adapter means being arranged side-by-side.

8. The docking station of claim 7 wherein the mast latch means includes said collar attached to an outer end of the mast, the latches comprising the latch mechanism of the mast latch means being spaced about the collar.

9. The docking station of claim 8 wherein the mast latch means further includes a plurality of pads extending therefrom and abutting the adapter means to bear against the adapter means when the adapter means and mast latch means are latched together to maintain the two collars in a spaced relationship with each other.

10. The docking station of claim 5 further including striker means engaging the latch mechanisms on the adapter means and mast latch means as the mast is retracted to engage the adapter means with the isolation means and disengage the adapter means from the mast latch means.

11. The docking station of claim 10 wherein the striker means further engages the adapter means with the isolation means and disengages the adapter means from the isolation means when the mast is extended.

12. The docking station of claim 11 wherein the striker means includes a plurality of striker bars mounted on the vehicle adjacent the isolation means to engage the respective latches on the mast latch means and adapter means to effect engagement of the adapter means with the isolation means and disengagement of the adapter means from the mast latch means as the mast is retracted and engagement of the adapter means with the mast latch means and disengagement of the adapter means from the isolation means when the mast is extended.

13. The docking station of claim 12 wherein the isolation means includes an isolation plate to which the adapter means is attached when the adapter means is engaged with the isolation means.

14. The docking station of claim 13 wherein the isolation means further includes at least one bracket and an isolator attached to the bracket and the isolation plate, the isolator attenuating vibrations and shocks transmitted through the vehicle so to isolate the sensors from the vibrations and shocks and prevent damage to them when the vehicle is moving.

15. The docking station of claim 14 wherein the sensors have an associated drive mechanism for moving the sensors from one orientation to another when the adapter means is engaged with the isolation means and the isolation means includes restraining means preventing twisting of the platform on which the sensors are mounted when the sensors are moved.

16. The docking station of claim 15 wherein the restraining means includes at least one lever arm one end of which is mounted to the bracket and a tie rod one end of which is attached to the other end of the lever and the other end of which connects to the isolation plate.

17. The docking station of claim 16 wherein the restraining means includes a plurality of levers and tie rods interconnecting the bracket and isolation plate thereby to prevent twisting of the sensor platform in any of the three axes of rotation about which it can twist.

18. The docking station of claim 3 wherein the mast latch means and adapter means each includes a latching mechanism for latching the adapter means and the mast latch means together when the mast is raised, and for disengaging the adapter means and mast latch means from each other when the mast is retracted while engaging the adapter means and the isolation means at that time.

19. The docking station of claim 18 wherein the respective latching mechanisms on the mast latch means and the adapter means each includes a plurality of latches spaced about the respective means.

20. The docking station of claim 19 further including a plurality of striker bars mounted on the isolation means to engage the respective latches on the mast latch means and adapter means and effect engagement of the adapter means with the isolation means and disengagement of the adapter means from the mast latch means as the mast is retracted and engagement of the adapter means with the mast latch means and disengagement of the adapter means from the isolation means when the mast is extended.

21. The docking station of claim 1 wherein the isolation means includes an isolation plate to which the adapter means is attached when the adapter means is engaged with the isolation means.

22. The docking station of claim 21 wherein the isolation means further includes at least one bracket and a plurality of isolators attached to the bracket and the isolation plate, the isolators attenuating vibrations and shocks transmitted through the vehicle so to isolate the sensors from the vibrations and shocks and prevent damage to them when the vehicle is moving.

23. The docking station of claim 22 wherein the sensors have an associated drive mechanism for moving the sensors from one orientation to another when the adapter means is engaged with the isolation means and the isolation means includes restraining means preventing twisting of the platform on which the sensors are mounted when the sensors are moved.

24. The docking station of claim 23 wherein the restraining means includes at least one lever arm one end of which is mounted in the bracket and a turnbuckle one end of which is attached to the other end of the lever and the other end of which connects to the isolation plate.

25. The docking station of claim 24 wherein the restraining means includes a plurality of levers and associated turnbuckles interconnecting the bracket and isolation plate thereby to prevent twisting of the sensor platform in any of the three axis of rotation about which it can twist.

26. A docking station for use on a vehicle having an extendible and retractable mast, one or more sensors used for gathering information being installed on a platform connected to the mast so to be raised and lowered by the mast as the mast is extended and retracted, the docking station comprising:

mast latch means attached to an outer end of the mast;

adapter means connected to the platform and disengagingly attached to the mast latch means;

a separate latching mechanism carried on each of the mast latch means and the adapter means, the latching mechanism on the mast latch means latching the adapter means and the mast latch means together when the mast is raised and disengaging the adapter means and mast latch means from each other when the mast is retracted; and, isolation means mounted on a surface of the vehicle adjacent an opening therein through which the mast projects, the latching mechanisms on the adapter means latching the adapter means and isolation means together as the mast is retracted so to attach the sensor platform to the isolation means which protects the sensors from damage caused by shock and vibration as the vehicle moves, the adapter means re-engaging with the mast latch means and disengaging from the isolation means when the mast is again extended after the vehicle stops.

27. The docking station of claim 26 wherein the respective latching mechanisms on the mast latch means and the adapter means each include a plurality of latches spaced about the respective mast latch means and adapter means.

28. The docking station of claim 27 further including a plurality of striker bars mounted on the isolation means to engage the respective latches on the mast latch means and adapter means and effect engagement of the adapter means with the isolation means and disengagement of the adapter means from the mast latch means as the mast is retracted and engagement of the adapter means with the mast latch means and disengagement of the adapter means from the isolation means when the mast is extended.

29. The docking station of claim 26 wherein the isolation means includes an isolation plate to which the adapter means is attached when the adapter means is engaged with the isolation means.

30. The docking station of claim 29 wherein the isolation means further includes at least one bracket and an isolator attached to the bracket and the isolation plate, the isolators attenuating vibrations and shocks transmitted through the vehicle so to isolate the sensors from the vibrations and shocks and prevent damage to them when the vehicle is moving.

31. The docking station of claim 30 wherein the sensors have an associated drive mechanism for moving the sensors from one orientation to another when the adapter means is engaged with the isolation means and the isolation means includes restraining means preventing twisting of the platform on which the sensors are mounted when the sensors are moved.

32. The docking station of claim 31 wherein the restraining means includes at least one lever arm one end of which is attached to the bracket and a turnbuckle one end of which is attached to the other end of the lever and the other end of which connects to the isolation plate.

33. The docking station of claim 32 wherein the restraining means includes a plurality of levers and turnbuckles interconnecting the bracket and isolation plate thereby to prevent twisting of the sensor platform in any of the three axis of rotation about which it can twist.

34. A method of docking a suite of sensors comprising one or more sensors mounted on a platform onto the end of an extendible and retractable mast when the mast is extended and onto a separate structure when the mast is retracted so to protect the sensor suite from damage, the method comprising:

attaching the platform to an adapter means and attaching a mast latch means to the outer end of the mast;

disengagingly attaching the adapter means to the mast latch means, the mast latch means each including a latching mechanism by which the two means are disengagingly attached to each other;

engaging the adapter means with an isolation means as the mast is retracted, the mast latch means including a latch mechanism by which the two means are attached to each other with the adapter means being contemporaneously disengaged from the mast latch means thereby to attach the platform to the isolation means which protects the sensors from damage caused by shock and vibration; and, re-engaging the adapter means with the mast latch means when the mast is next extended while disengaging the adapter means from the isolation means.

* * * * *